United States Patent
Jain et al.

(10) Patent No.: US 9,548,917 B2
(45) Date of Patent: Jan. 17, 2017

(54) EFFICIENT MULTICAST DELIVERY TO DUALLY CONNECTED (VPC) HOSTS IN OVERLAY NETWORKS

(71) Applicant: Cisco Technology, Inc., San Jose, CA (US)

(72) Inventors: Vipin Jain, San Jose, CA (US); Vijay Gopal Krishnan, Milpitas, CA (US); Raghava Kodigenahalli Sivaramu, Sunnyvale, CA (US); Dhananjaya Rao, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 271 days.

(21) Appl. No.: 13/868,590

(22) Filed: Apr. 23, 2013

(65) Prior Publication Data

US 2014/0314079 A1    Oct. 23, 2014

(51) Int. Cl.

| H04L 12/28  | (2006.01) |
|---|---|
| H04L 12/56  | (2006.01) |
| H04L 12/761 | (2013.01) |
| H04L 12/931 | (2013.01) |
| H04L 12/46  | (2006.01) |
| H04L 12/18  | (2006.01) |

(52) U.S. Cl.
CPC ......... *H04L 45/16* (2013.01); *H04L 12/1886* (2013.01); *H04L 12/4645* (2013.01); *H04L 49/354* (2013.01)

(58) Field of Classification Search
CPC .... H04L 12/4645; H04L 45/16; H04L 49/354; H04L 12/185
See application file for complete search history.

(56) References Cited

U.S. PATENT DOCUMENTS

| 7,558,219 | B1 * | 7/2009 | Aggarwal | H04L 12/18 370/256 |
|---|---|---|---|---|
| 8,537,816 | B2 * | 9/2013 | Anumala | H04L 12/1886 370/389 |
| 2003/0165140 | A1 * | 9/2003 | Tang | H04L 12/18 370/393 |
| 2010/0061269 | A1 * | 3/2010 | Banerjee | H04L 12/4675 370/254 |
| 2010/0309820 | A1 * | 12/2010 | Rajagopalan | H04L 12/462 370/256 |
| 2010/0329252 | A1 * | 12/2010 | Mulamalla | H04L 12/18 370/390 |
| 2012/0201124 | A1 * | 8/2012 | Marques | H04L 45/28 370/221 |
| 2013/0089093 | A1 |  4/2013 | Bacthu et al. | |

OTHER PUBLICATIONS

International Search Report & Written Opinion in International Application No. PCT/US2014/034808 mailed Sep. 2, 2014, 8 pgs.

\* cited by examiner

*Primary Examiner* — Christine Duong
*Assistant Examiner* — Abdelillah Elmejjarmi
(74) *Attorney, Agent, or Firm* — Merchant & Gould P.C.

(57) ABSTRACT

In a mesh-based connected data center network architecture, a mechanism is provided to allow efficient delivery of IP multicast frames within the network. Described approaches avoid replication into VLANs (or SVIs) across the fabric by using the outer encapsulated tree to identify trees on which to replicate the traffic. Replication may be performed at the furthest point from the source (via routing or bridging). Also, multicast traffic may be distributed to dually connected (vPC) hosts on links from various network devices.

17 Claims, 5 Drawing Sheets

EFFICIENT MULTICAST DELIVERY TO DUALLY CONNECTED (VPC) HOSTS IN OVERLAY NETWORKS

BACKGROUND

Hosts may be expected to connect to the network via multiple links in active-active mode (as opposed to active-standby) for load sharing and increased bandwidth. These links are often seen as part of a layer-2 ether-channel (link aggregation, IEEE 802.3ad). Using existing virtual Port-Channel ("vPC") technology, these links may terminate on two different physical devices. However, when bridging or routing an IP multicast packet, the host may only expect a single copy of a multicast from the network on the Port-Channel ("PC") or a vPC.

It may be common to employ an encapsulation, also known as an overlay network, within data center networks to transport multi-destination frames in an outer delivery tree. Use of a delivery tree, based on an overlay multicast group may allow inner multicast groups belonging to different layer-2 segments to share a mapped delivery tree identified by the outer header encapsulation.

When multicast recipients happen to be in different VLANs, a router may implement a function of replicating multicast traffic to one or more VLANs dependant upon hosts registering their interest in specific multicast groups within respective VLANs. In a layer-2 overlay fabric topology, this may mean that a packet needed routing with result in multiple copies (one in each VLAN) of multicast traffic sent to the fabric, which is inefficient because of replication across VLANs. An easy way to avoid the multiple copy problem is to use a routed segment that just interconnects the replication points in the network. However, such an approach may result in the loss of the originating VLAN, which may be needed to avoid sending frames back to the vPC link in the same VLAN. This may force the network to replicate the multicast traffic, which consumes precious bandwidth.

BRIEF DESCRIPTION OF THE DRAWINGS

The accompanying drawings, which are incorporated in and constitute a part of this disclosure, illustrate various embodiments. In the drawings.

DETAILED DESCRIPTION OF EXAMPLE EMBODIMENTS

Overview

Figure 1:
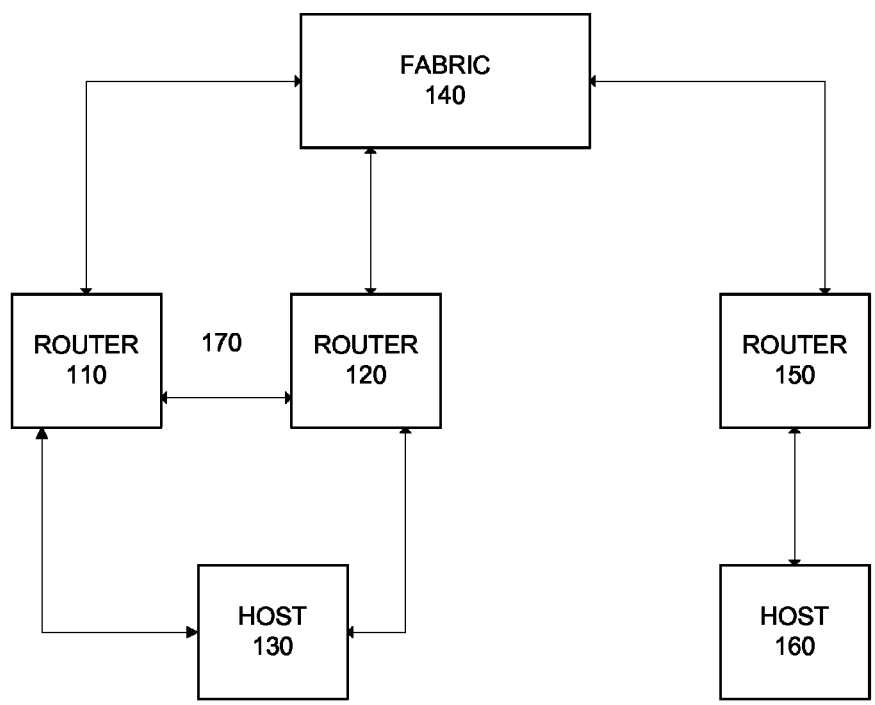
FIG. 1 illustrates an example network environment for embodiments of this disclosure.

Consistent with embodiments of the present disclosure, systems and methods are disclosed for an optimized method of delivering IP multicast traffic in an overlay network fabric to or from dually (vPC) connected hosts.

In some embodiments, a method of delivering IP multicast traffic may be described comprising: computing a first plurality of delivery groups (also referred to as delivery trees) within a first fabric; electing a first router as a designated forwarder for a first delivery group; receiving interest to join the first delivery group from a first host device, wherein the first host device is dually connected to the first fabric through the first router and a second router; registering first delivery group interest for the first router and the second router with the first fabric; receiving IP multicast traffic associated with the first delivery group at the first router and the second router; and forwarding the IP multicast traffic to the first host device only from the first router.

In some embodiments, a network device for sending multicast traffic may be described comprising: a memory containing executable instructions for causing a processor to perform operations comprising: identifying an overlay multicast delivery tree for incoming multicast traffic; determining a delivery VLAN which maintains the uniqueness of a plurality of inner multicast groups across one or more Virtual Routing and Forwarding ("VRF") instances within a first fabric; and selecting a multicast group for which the network device is a designated forwarder.

In some embodiments, a network device for receiving multicast traffic comprising: a memory containing executable instructions for causing a processor to perform operations comprising: computing a first plurality of delivery groups within a first fabric; electing a designated forwarder for a first delivery group; decapsulating encapsulated identification of a first mapped delivery tree for delivery of multicast traffic associated with the first delivery group; and routing the multicast traffic to one or more interested devices.

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description.

Example Embodiments

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and substituting, reordering, or adding stages to the disclosed methods may modify the methods described herein. Accordingly, the following detailed description does not limit the disclosure. Instead, the proper scope of the disclosure is defined by the appended claims.

In an Equal-cost Multi-path ("ECMP") overlay network architecture, embodiments of the present disclosure provide a mechanism to allow the most efficient delivery of IP multicast frames within the network. Described approaches avoid replication into VLANs (or Switch Virtual Interfaces, "SVIs") across the fabric. Replication may be performed at the furthest point from the source (via routing or bridging). Also, multicast traffic may be distributed to dually connected (vPC) hosts on links from various network devices.

Layer-2 forwarding rules may also be preserved. Specifically, rules may be in place to never send the frame back to the sender. Similarly, a rule may be in place to deliver one and only one copy of a frame to a recipient.

In a multicast environment, a sending server may transmit a single data stream for each multicast group, regardless of the number of clients that will view it. The data stream may then be replicated as required by the network's multicast routers and switches to allow an arbitrary number of clients to subscribe to the multicast address and receive the broadcast. In the router network, replication may occur only at branches of the distribution tree, so the vast majority of the replication may occur at the last switch hop (the one closer to the recipient).

Where there are a large number of recipients of a replicated transmission, multicast technology makes a difference in both server load and network load, even in a simple network with a small number of router and switch hops. Multicast transmissions may be delivered nearly simultaneously to all members of a recipient group. The variability in delivery time is limited to differences in end-to-end network delay among the range of server-to-client paths. In multicast, the server may not know the unicast network address of any particular recipient of the transmission—all recipients share the same multicast network address and therefore can join a multicast group while maintaining anonymity.

Multicast transmission technology may be available at both the data link layer (Layer 2) and the network layer (Layer 3). For example, Ethernet, Fiber Distributed Data Interface (FDDI), and SMDS all support unicast, multicast, and broadcast MAC layer addresses. Therefore, an individual computer on these networks can simultaneously listen to a unicast address, multiple multicast addresses, and the broadcast address.

Referring to FIG. 1, an example of a network in which embodiments described herein may be implemented is shown. The embodiments described herein may operate in the context of a data communication network including multiple network devices. Some of the devices in the network may be routing bridges, switches, bridges, routers, gateways, or other network devices. In some embodiments, the network device is implemented on a general purpose machine as described below with respect to FIG. 5.

In embodiments of the present disclosure, a router 110 and a router 120 may be in communication with a first host device 130. Such a first host device 130 may be a switch that is not itself a participant in the overlay network. Router 110 and router 120 may be connected to a fabric switch 140. Fabric switch 140 may provide a communications path to a router 150. Router 150 may be in communication with a second host device 160. Here, host device 130 would be considered a dually connected host device as it is connected to two routers in an overlay fabric.

Embodiments of the present disclosure may also be operable where router 110 and router 120 are connected to a switch, such as a blade switch. In other words, the blade switch may be connected to router 110 and router 120 instead of a server or host device. This dual connectivity may be to a device where the boundary to the overlay network begins. In such a case, fabric 140 may be viewed at as am overlay fabric.

Router 110 and router 120 may be vPC peers connected via a peer link 170. Host device 130 is dually attached to the two vPC nodes router 110 and router 120. This is a typical example of vPC access connectivity for host devices.

Embodiments of the present disclosure provide a delivery system for such networks that avoids VLAN replication into fabric switch 140 on leaf devices (host attached devices). A single copy of multicast traffic may be delivered to vPC recipients (host device 130, in the above example). Multicast traffic originated from vPC links may be prevented from being accidentally delivered back to the associated host device. Furthermore, embodiments may provide a good approach for distributing multicast traffic on all vPC links towards the host device.

Before multicast traffic is admitted into a fabric through fabric switch 140, or other appropriate device, the fabric (including all node residing within the fabric) may compute up to a predetermined number n of shared multicast trees in the fabric. Such shared multicast trees may be referred to as delivery groups within the fabric. vPC peer nodes may elect themselves or be configured to be a designated forwarder for each of the multicast trees of delivery groups.

Viewing described embodiments at the sender leaf device, it may be seen that sender leaf (router device) can identify an overlay multicast delivery tree for incoming IP multicast traffic. In other words, the inner multicast group may be mapped to an outer delivery group either based on configuration, an external entity, or based on a symmetrical hashing on the nodes. The sender leaf device may also determine a delivery VLAN (unique per vRF) to maintain the uniqueness of the inner multicast groups across vRFs within the fabric. The sender leaf device may always pick a delivery group for which it is the designated forwarder.

Viewing described embodiments at the recipient leaf device, it may be seen that recipient leaf devices may decapsulate the outer group and route the inner IP multicast traffic to desired recipients. However, there is an exception if a vPC node is not the designated, the vPC leaf device may block traffic via an application specific integrated circuit ("ASIC") towards vPC connected hosts/devices after performing the routing function.

Here, the context, of a tree identification to allow or disallow the forwarding toward vPC links may be taken from the outer/overlay header and applied to subsequently routed frames. This approach provides efficient forwarding in meshed fabrics as discussed herein.

When a "join" interest is received from a vPC host or a vPC connected layer-2 switch, such as host device 130, both connected routers, router 110 and router 120 in the example, register interest for the delivery group to the fabric. Therefore, in the event that both connected router 110 and router 120 receive multicast traffic, only one of the two routers will forward the traffic. The forwarding router may be the router selected as the designated forwarder. This allows for well distributed utilization of multicast traffic towards hosts for the various groups for which it subscribes to.

Figure 2:
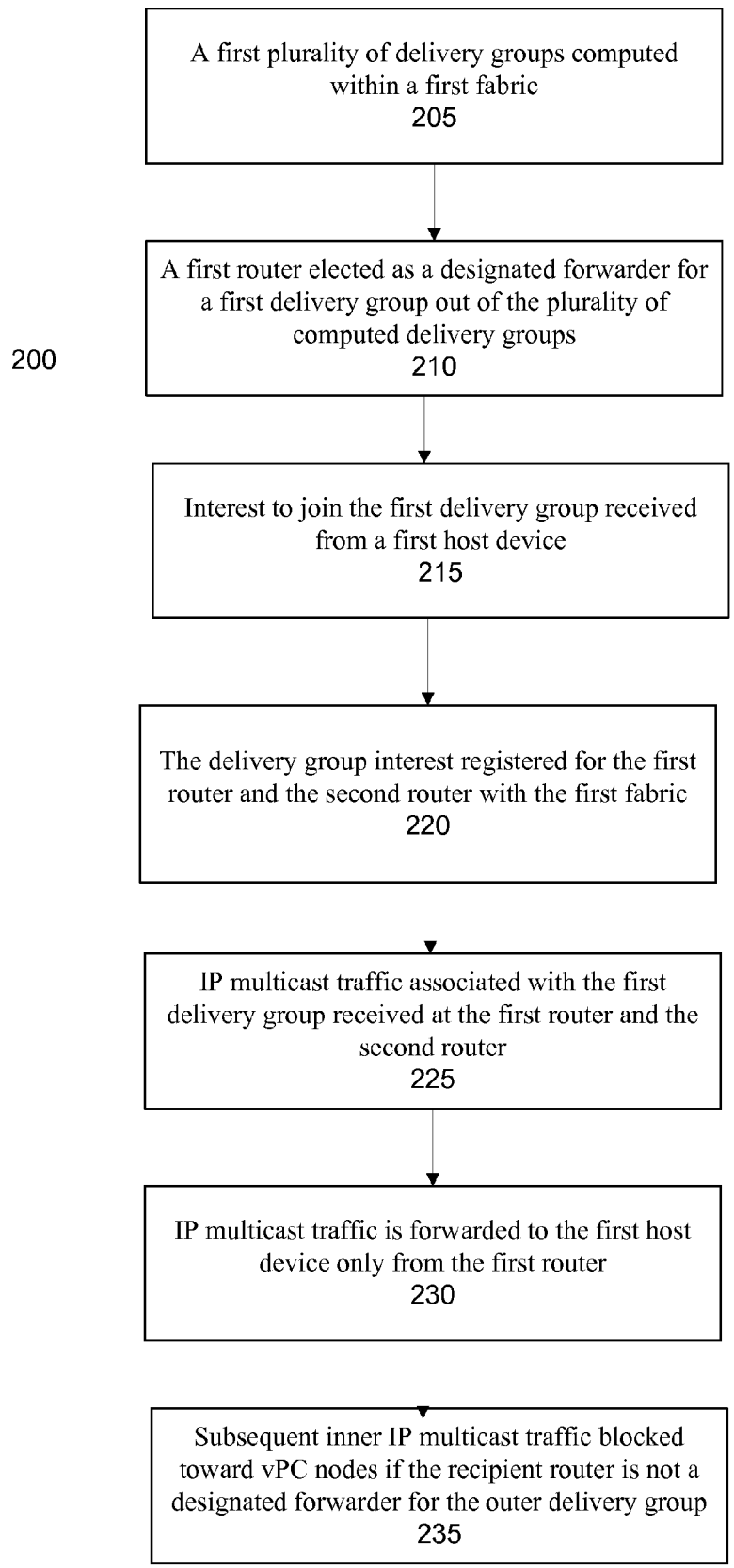
FIG. 2 is a flow chart illustrating embodiments of this disclosure.

FIG. 2 is a flow chart illustrating operation of embodiments of the present disclosure for efficient IP multicast traffic delivery. Method 200 may begin at step 205, where a first plurality of delivery groups may be computed within a first fabric. It should be understood that nodes may join and leave delivery groups at any time. As such, step 205 may be repeated at periodic intervals to ensure up to date delivery group information.

Once the delivery groups have been computed, method 200 may proceed to step 210. At step 210, a first router may be elected as a designated forwarder for a first delivery group out of the plurality of computed delivery groups. There are a number of methods of designated router election. For example, each eligible router may start with a predetermined designated router priority value. This priority value may be raised or lowered based on network conditions and device conditions. When multiple routers have the same priority value, the priority tie may be broken based on router ID values. In some embodiments of the present disclosure, the designated forwarder for each delivery group may be elected by a plurality of vPC peer nodes.

After election of the designated forwarder for the first delivery group, method 200 may proceed to step 215. At step 215, interest to join the first delivery group may be received from a first host device. In some embodiments of the present disclosure, the first host device may be dually connected to the first fabric through the first router and a second router. Internet Group Management Protocol ("IGMP") messages, such as JOIN/LEAVE interest may be used by multicast hosts to signal interest in joining a specific multicast group and to begin receiving group traffic.

After receipt of delivery group interest at step 215, method 200 may proceed to step 220. At step 220, the delivery group interest may be registered for the first router and the second router with the first fabric. While both routers may be capable of providing the multicast traffic to the host, the first router has been designated as the designated forwarder for data in the delivery group of interest.

At step 225, IP multicast traffic associated with the first delivery group may be received at the first router and the second router. A sending router responsible for sending the IP multicast traffic may identify an overlay multicast delivery tree for the IP multicast traffic. Such overlay multicast delivery trees may avoid the creating of routing loops. In some embodiments of the present disclosure, identifying the overlay multicast delivery tree may further comprise mapping an inner IP multicast group to an outer delivery group. This may result in mapping the outer IP source header to that of the inner header. The sending router may further determine a unique delivery VLAN for the multicast traffic to identify the VRF.

As the first router is the designated forwarder for this delivery group, method 200 proceeds to step 230 and the IP multicast traffic is forwarded to the first host device only from the first router. Upon receipt at a recipient router, the recipient router may decapsulate the outer delivery group and route the inner IP multicast traffic to one or more recipients. Finally, at step 235, subsequent inner IP multicast traffic may be blocked toward vPC nodes if the recipient router is not a designated forwarder for the outer delivery group.

Figure 3:
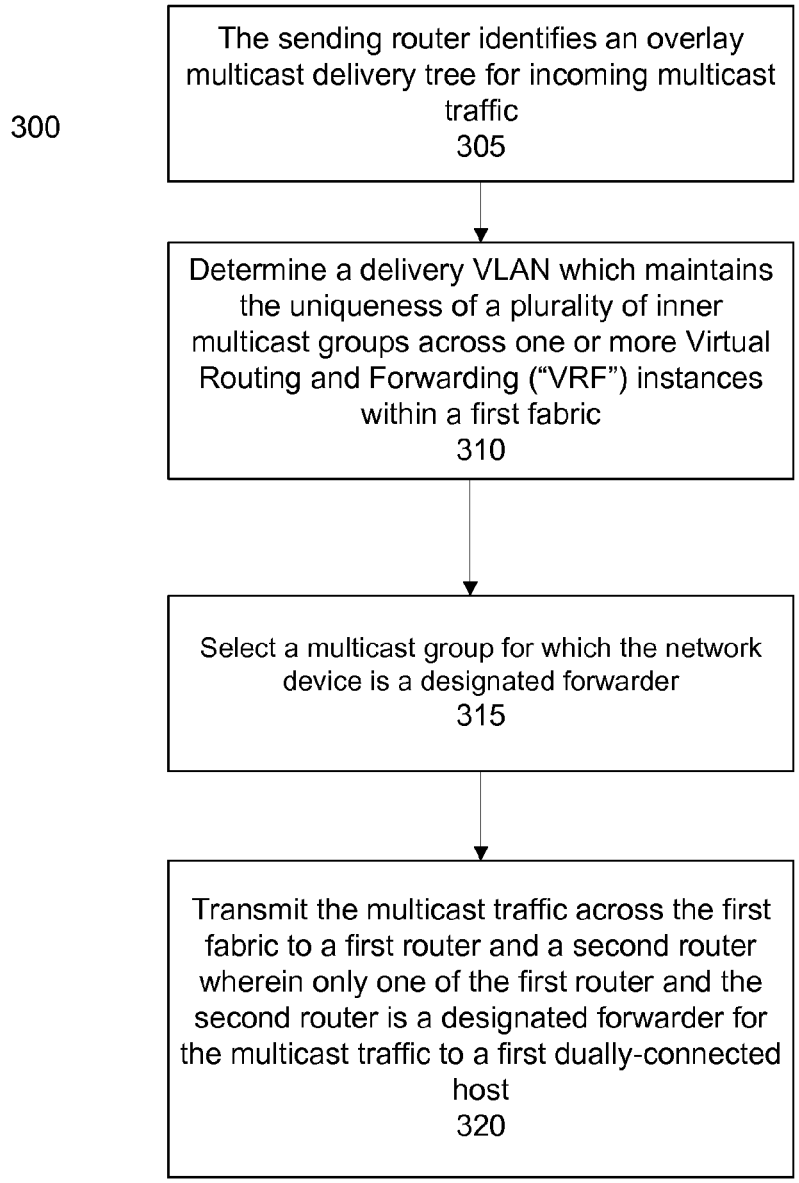
FIG. 3 is a flow chart illustrating embodiments of this disclosure.

FIG. 3 is a flow chart illustrating operation of embodiments of the present disclosure for efficient IP multicast traffic delivery from the perspective of a sending router. In some embodiments, the sending router may be a router device connected to a first fabric. Method 300 may begin at step 305, where the sending router may identify an overlay multicast delivery tree for incoming multicast traffic. The overlay information may be the result of mapping an inner IP multicast group to an outer delivery group and encapsulating the identification of the mapped delivery tree in an outer delivery group header.

In some embodiments, the identification of the mapped delivery tree may be specified as a forwarding tag in the encapsulated header. The Forwarding Tag (FTag) in the header may specify which one of multiple trees that the multi-destination packet traverses throughout the Fabric network. FTag-specified paths may be used for multidestination packets that enter the network. The FTag may be a fixed route that the software learns from the topology. The FTag may be a 10-bit field with the values from 1 to 1024. It should be understood that in some embodiments, the FTag identifier can vary depending on the overlay encapsulation technology, for example a 10-bit Ftag may be used for FabricPath encapsulation while a 16-bit Rbridge ID may be used for TRILL networks or outer multicast groups for IP encapsulated frames. This tree identified by FTag may be honored by all subsequent switches in that network. Each FTag may be unique within one topology.

Method 300 may then proceed to step 310. At step 310, a delivery VLAN which maintains the uniqueness of a plurality of inner multicast groups across one or more Virtual Routing and Forwarding ("VRF") instances within a first fabric may be determined. In example embodiments, a switch may be connected to a number of remote switch devices accessed through differing ports. Each remote switch may then be configured to communicate with one or more attached VLANs.

Upon the determination of the delivery VLAN, method 300 may proceed to step 315. At step 315, a multicast group for which the network device is a designated forwarder may be selected. In some embodiments, multicast group information may be advertised to network devices. Network device peers may elect a particular network device to be the designated forwarder associated with a particular delivery group.

Method 300 may then proceed to step 320 where the sending device may transmit the multicast traffic across the first fabric to a first router and a second router wherein only one of the first router and the second router is a designated forwarder for transmitting the multicast traffic to a first dually-connected host. In some embodiments, the multicast traffic may be transmitted to the first dually connected host, wherein the first dually connected host is located on a first VLAN separate from a second VLAN on which the network device resides.

Figure 4:
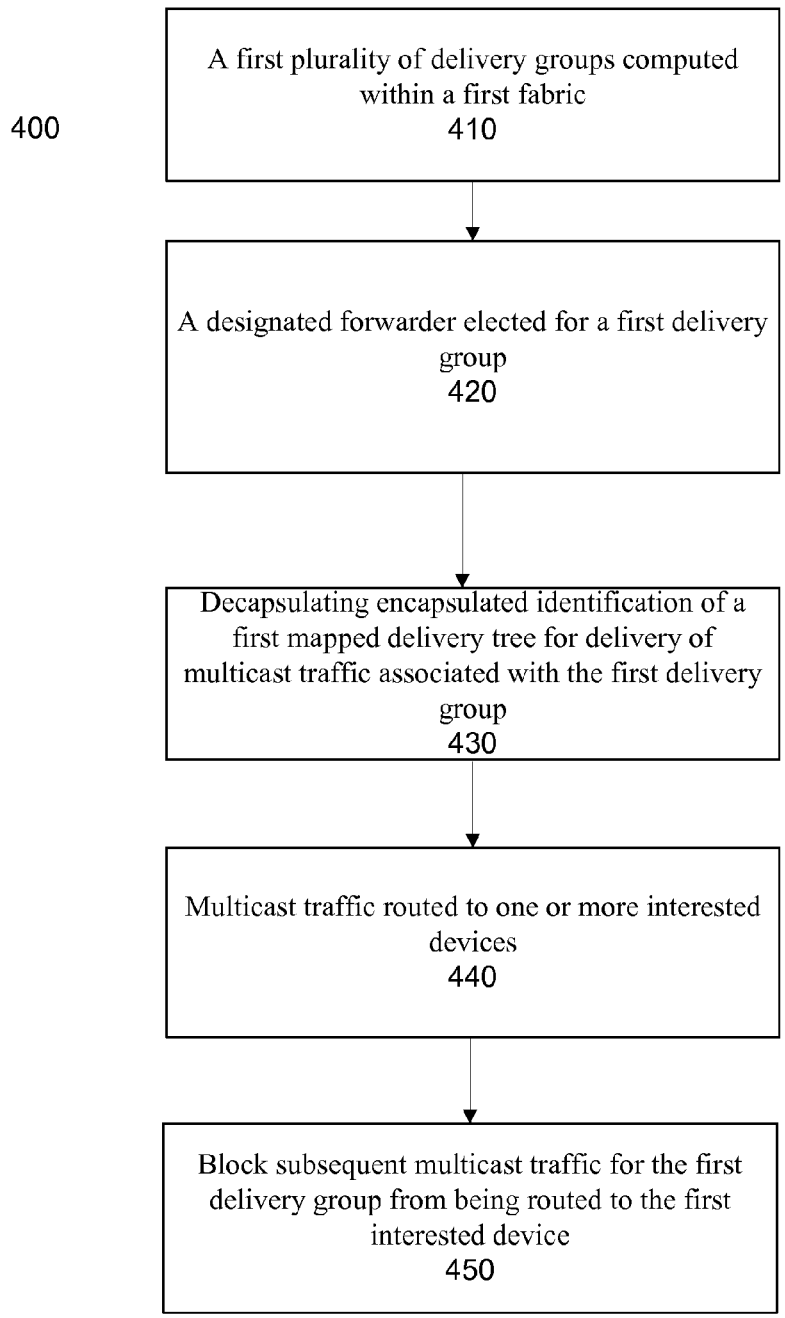
FIG. 4 is a flow chart illustrating embodiments of this disclosure.

FIG. 4 is a flow chart illustrating operation of embodiments of the present disclosure for efficient IP multicast traffic delivery from the perspective of a recipient router. Method 400 may begin at step 410 where a first plurality of delivery groups may be computed within a first fabric. Various delivery groups may relate to various categories of content of interest.

Method 400 may proceed to step 420. At step 420, a designated forwarder may be elected for a first delivery group. As discussed above, there are a number of election methods compatible with embodiments of the present disclosure. After election of a designated forwarder, method 400 may proceed to step 430, where encapsulated identification of a first mapped delivery tree for delivery of multicast traffic associated with the first delivery group may be decapsulated.

After decapsulation of the delivery group information, method 400 may proceed to step 440. At step 440, the multicast traffic may be routed to one or more interested devices. In some embodiments of the present disclosure, the multicast traffic may be routed to a first interested device, wherein the first interested device is not a designated forwarder for the first delivery group. If that is the case, method 400 may proceed to step 450 and block subsequent multicast traffic for the first delivery group from being routed to the first interested device. The recipient router may further comprise an application specific integrated circuit configured to block the subsequent multicast traffic for the first delivery group from being routed to the first interested device.

Figure 5:
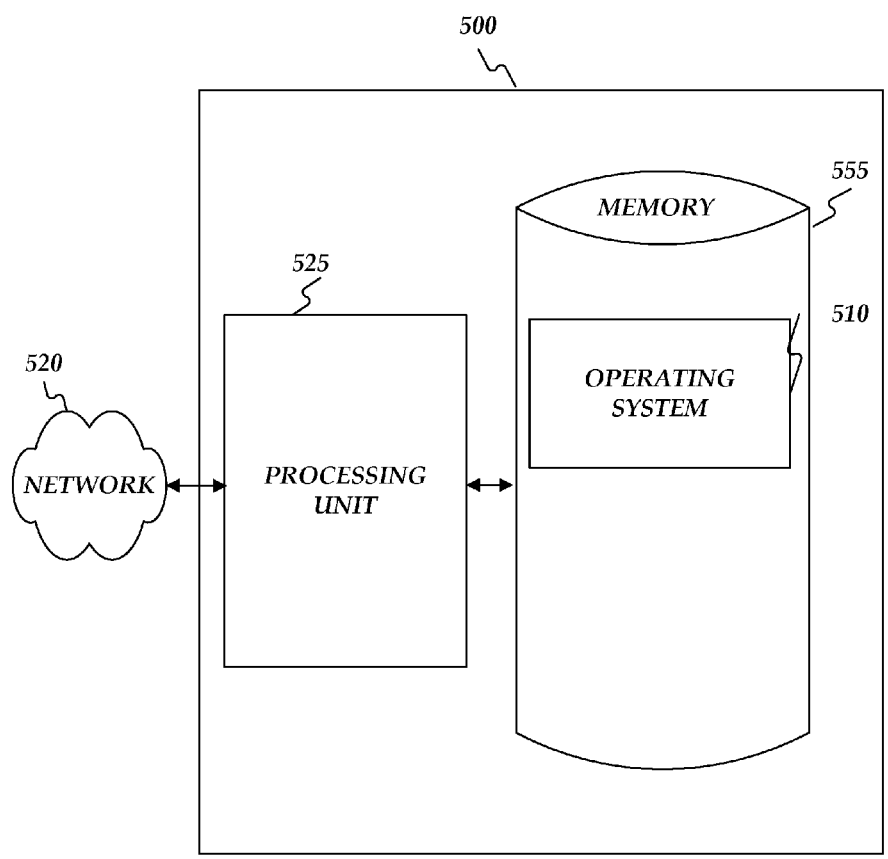
FIG. 5 is a block diagram of a computing network device.

FIG. 5 illustrates a computing device 500, such as a server, host, or other network devices described in the present specification. Computing device 500 may include processing unit 525 and memory 555. Memory 555 may include software configured to execute application modules such as an operating system 510. Computing device 500 may execute, for example, one or more stages included in the methods as described above. Moreover, any one or more of the stages included in the above describe methods may be performed on any element shown in FIG. 5.

Computing device 500 may be implemented using a personal computer, a network computer, a mainframe, a computing appliance, or other similar microcomputer-based workstation. The processor may comprise any computer operating environment, such as hand-held devices, multi-processor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal. The aforementioned systems and devices are examples and the processor may comprise other systems or devices.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

What is claimed is:

1. A method of delivering Internet Protocol (IP) multicast traffic comprising:
computing a first plurality of delivery groups within a first fabric;
electing a first router as a designated forwarder for a first delivery group, wherein the designated forwarder is elected by a plurality of virtual port channel (vPC) peer nodes;
receiving interest to join the first delivery group from a first host device, wherein the first host device is dually connected to the first fabric through the first router and a second router;
registering first delivery group interest for the first router and the second router with the first fabric;
receiving IP multicast traffic associated with the first delivery group at the first router and the second router; and
forwarding the IP multicast traffic to the first host device only from the first router across a plurality of virtual local area networks (VLANs), wherein forwarding the IP multicast traffic to the first host device only from the first router comprises:
identifying a delivery group from the first plurality of delivery groups for the received IP multicast traffic, wherein identifying the delivery group comprises mapping an inner IP multicast group to an outer delivery group and encapsulating an identification of the mapped inner IP multicast group in an outer delivery group header;
forwarding the IP multicast traffic to the mapped inner IP multicast group;
blocking subsequent forwarding of the IP multicast traffic to the mapped inner IP multicast group from another recipient router not designated as a forwarder for the mapped inner IP multicast group, wherein blocking the subsequent forwarding of the IP multicast traffic comprises blocking the subsequent forwarding of the IP multicast traffic by an application specific integrated circuit configured to block the subsequent IP multicast traffic for the delivery group from being routed; and
ensuring that replication of the IP multicast traffic occurs at a furthest point from a source as possible on a network path from a source to a recipient host.

2. The method of claim 1, wherein identifying the delivery group comprises identifying an overlay multicast delivery tree for the IP multicast traffic.

3. The method of claim 2, further comprising: determining a unique delivery VLAN at the first router.

4. The method of claim 3, further comprising:
decapsulating the outer delivery group at a recipient router; and
routing the inner IP multicast traffic to one or more recipients.

5. The method of claim 1, wherein encapsulating the identification comprises encapsulating a forwarding tag in the outer delivery group header.

6. The method of claim 5, wherein encapsulating the forwarding tag comprises encapsulating the forwarding tag specifying which one of a multi-destination trees a packet traverses throughout the first fabric.

7. The method of claim 5, wherein encapsulating the forwarding tag comprises encapsulating the forwarding tag comprising a fixed route for a packet learned from a topology of the first fabric.

8. A network device for sending multicast traffic comprising:
a memory containing executable instructions for causing a processor to perform operations comprising:
identifying an overlay multicast delivery tree for incoming multicast traffic;
determining a delivery virtual local area network (VLAN) which maintains the uniqueness of a plurality of inner multicast groups across one or more Virtual Routing and Forwarding ("VRF") instances within a first fabric;
selecting a multicast group for which the network device is a designated forwarder, wherein the network device is elected as the designated forwarder by a plurality of virtual port channel (vPC) peers;
forwarding the incoming multicast traffic to the selected multicast group, wherein forwarding the incoming multicast traffic to selected multicast group comprises:

mapping an inner multicast group to an outer delivery group;

encapsulating an identification of the mapped inner multicast group in an outer delivery group header; and forwarding the incoming multicast traffic to the mapped inner multicast group;

blocking subsequent forwarding of the incoming multicast traffic to the mapped inner multicast group from a recipient router not designated as a forwarder for the mapped inner multicast group, wherein blocking the subsequent forwarding of the IP multicast traffic comprises blocking the subsequent forwarding of the IP multicast traffic by an application specific integrated circuit configured to block the subsequent IP multicast traffic for the delivery group from being routed; and ensuring that replication of Internet Protocol (IP) traffic occurs at a furthest point from a source as possible on a network path from a source to a recipient host.

9. The network device of claim 8, wherein the network device is a router connected to the first fabric.

10. The network device of claim 9, wherein the memory contains instructions further comprising:

transmitting the multicast traffic across the first fabric to a first router and a second router wherein only one of the first router and the second router is a designated forwarder for the multicast traffic to a first dually-connected host.

11. The network device of claim 10, wherein the memory contains instructions further comprising:

transmitting the multicast traffic to the first dually connected host, wherein the first dually connected host in located on a first VLAN separate from a second VLAN on which the network device resides.

12. The network device of claim 8, wherein the memory contains instructions further comprising:

encapsulating the identification of the mapped delivery tree in a forwarding tag.

13. The network device of claim 12, wherein the forwarding tag comprises at least one of the following:

a ten-bit field for a FabricPath encapsulation; and a sixteen-bit field for a IP encapsulation.

14. A network device for receiving multicast traffic comprising:

a memory containing executable instructions for causing a processor to perform operations comprising:

computing a first plurality of delivery groups within a first fabric;

electing a designated forwarder for a first delivery group, wherein the designated forwarder is elected by a plurality of virtual port channel (vPC) peer nodes;

decapsulating encapsulated identification of a first mapped delivery tree for delivery of multicast traffic associated with the first delivery group;

routing the multicast traffic to one or more interested devices, wherein mapping the multicast traffic to one or more interested devices comprises:

mapping an inner multicast group to an outer delivery group;

encapsulating an identification of the mapped inner multicast group in an outer delivery group header; and routing the multicast traffic to the mapped inner multicast group;

blocking subsequent forwarding of the incoming multicast traffic to the mapped inner multicast group from a recipient router not designated as a forwarder for the mapped inner multicast group, wherein blocking the subsequent forwarding of the IP multicast traffic comprises blocking the subsequent forwarding of the IP multicast traffic by an application specific integrated circuit configured to block the subsequent IP multicast traffic for the delivery group from being routed; and ensuring that replication of Internet Protocol (IP) traffic occurs at the furthest point from a source as possible on a network path from a source to a recipient host.

15. The network device of claim 14, wherein the network device further comprises:

an application specific integrated circuit configured to block the subsequent multicast traffic for the first delivery group from being routed to the first interested device.

16. The network device of claim 14, wherein the memory contains instructions further comprising:

ensuring that each of the one or more interested devices only receives a single copy of the multicast traffic.

17. The network device of claim 14, wherein the memory contains instructions further comprising:

decapsulating encapsulated identification of a first mapped delivery tree for delivery of multicast traffic associated with the first delivery group, wherein the identification is encapsulated in a forwarding tag.

* * * * *